Dec. 26, 1961     L. E. OBERDICK     3,014,330
ROTARY POWER LAWNMOWER
Filed March 25, 1959
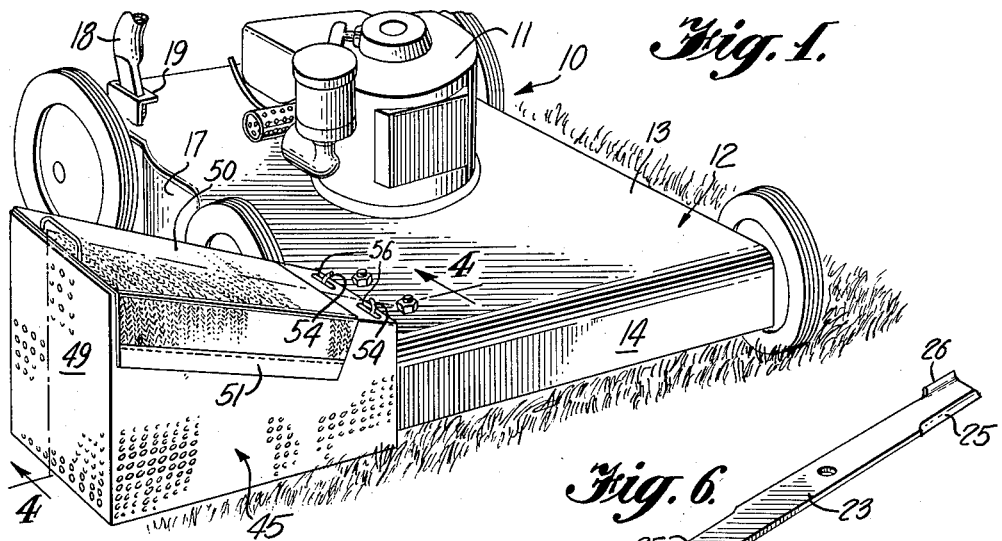
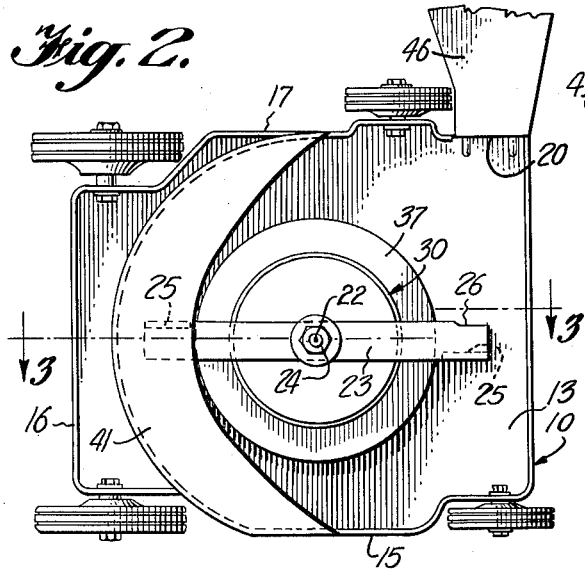
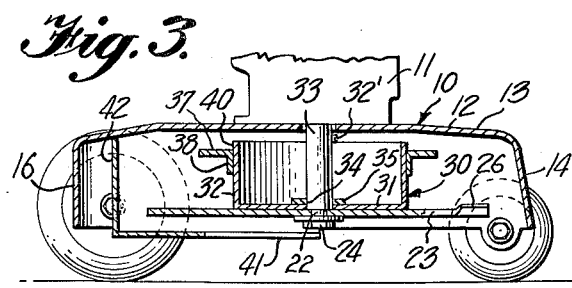
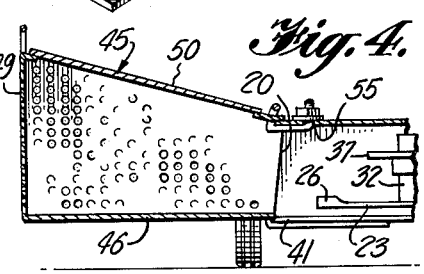
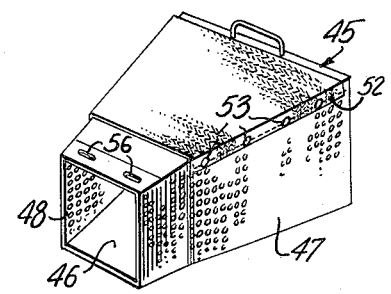
INVENTOR
*Luther E. Oberdick*
BY *Mason, Fenwick & Lawrence*
ATTORNEYS

United States Patent Office 3,014,330
Patented Dec. 26, 1961

3,014,330
ROTARY POWER LAWNMOWER
Luther E. Oberdick, 327 W. Townley, Phoenix, Ariz.
Filed Mar. 25, 1959, Ser. No. 801,799
5 Claims. (Cl. 56—25.4)

This invention relates to power lawn mowers, and more particularly to an improvement in rotary power lawn mowers.

Rotary type lawn mowers powered by a gasoline motor are very well known and perform well when the grass to be cut is dry and not so overgrown as to be unusually thick and high. If the grass is wet the grass does not pass freely out of the machine, and it accumulates under the deck of the mower where it is whipped and mascerated by the cutter blade until it becomes a sodden mass which will stop the motor and has to be dug out by hand before the cutting operation can be continued. To unclog the machine, the average home owner will insert his hand through the grass cutting outlet to dig out the accumulation, often without engaging the spark plug ground. This is a dangerous practice, and since the machine will become clogged after only a few feet of travel, it is an exasperating experience.

Grass cutting collectors have been proposed for rotary power mowers, but such collectors have required extensive modification of the design and operation of the mowers.

Consequently it is an object of the present invention to provide a rotary power lawn mower in which grass is severed and flows freely from the machine without being further beaten and cut by the blade.

It is a further object of the invention to provide a rotary power motor having a grass cutting collector which is efficient and requires no auxiliary power equipment.

Other objects and advantages of the present invention will become apparent to those skilled in the art from the following description when read in conjunction with the accompanying drawing, wherein:

FIGURE 1 is a perspective view of a rotary power lawn mower of the present invention;

FIGURE 2 is a bottom view of the rotary mower shown in FIGURE 1;

FIGURE 3 is a vertical sectional view taken on the line 3—3 of FIGURE 2;

FIGURE 4 is a vertical sectional view taken on the line 4—4 of FIGURE 1;

FIGURE 5 is a perspective view of the grass cutting collector, showing the inlet end of the collector;

FIGURE 6 is a perspective view of the cutter blade of the mower shown in FIGURE 1.

Adverting now to the drawing, and particularly FIGURES 1 and 2, there is shown a rotary lawn mower 10 having a power unit such as, for example, a gasoline motor 11 mounted on a wheeled body portion 12. The body portion 12 has a deck 13 with down turned flanges or walls 14, 15, 16 and 17 about its four sides, respectively. A handle 18 mounted in a bracket 19 at either side of the upper rear portion of the deck 13 is provided for pushing and guiding the mower over the lawn. An opening 20 is provided in the wall 17 at the front of the mower through which grass cuttings are expelled. The deck 13 is apertured to receive the depending drive shaft 22 of the motor 11.

The foregoing described elements are found on conventional types of rotary power lawn mowers. The present invention comprises the following elements which may be incorporated in the mower construction at the factory or sold as a kit to be added to existing lawnmowers.

A cutter blade 23 is mounted at the lower threaded end of the drive shaft 22 as by a nut 24, the cutter blade 23 having leading cutting edges 25 and upturned air vane 26 on the trailing edge at one end of the blade.

A drum 30 having a circular bottom plate 31 and a cylindrical upturned side wall 32 is fixedly mounted on a sleeve 33 which is received in a central aperture 34 of the bottom plate 31. A reinforcing washer 35 is welded to the sleeve 33 and the bottom plate 31. The sleeve 33 is of greater diameter than the cutter blade 23 is wide, and extends downward below the plate 31. Its outer end is mitered, and the cutter blade 23 seats within the miter so that the drum 30 and the cutter blade 23 rotate as a unit with the cutter blade 23 and the plate 31 in adjacency. The sleeve 33 is received on the drive shaft 22 and extends between the main bearing of the motor and the fastening nut 24. The cylindrical wall 32 extends upwardly from the bottom plate 31 to substantially the deck 13 of the mower, with ample tolerance to avoid its coming in contact with the deck. The diameter of the drum 30 is approximately one-half the diameter of the cutter blade 23. A horizontally extending annular ring plate or brim 37 having a downturned flange 38 is attached as by welding to the outside of the cylindrical wall 32. The brim 37 is spaced vertically from the cutter blade 23 and is positioned adjacent but below the top 40 of the wall 32. A set screw 32' fixedly mounts the sleeve 33 on the drive shaft 22.

A tunnel forming horizontal baffle 41 is attached to the bottom of the mower, and extends across substantially one-half of the mower in the plane of the bottom edges of the walls 14, 15, 16 and 17 to which it is attached, as seen in FIGURES 2 and 3.

The baffle 41 has joined to its rear edge an arcuate upturned vertical rear baffle or tunnel wall 42 which extends vertically to the deck 13 and transversely from the wall 15 to the wall 17. The baffle 41 forms with the deck 13, the upturned rear wall 42 and walls 15 and 17 of the mower a substantially semicircular tunnel, within which the cutter blade travels during one-half of its rotation.

In previously known mowers the air vanes at the tips of the cutter blade created a turbulent flow of air. There was a horizontal draft of air as a result of centrifugal force developed by the rotation, and there was an updraft created by the lift of the air vane. This updraft was converted by the deck of the mower into a down draft which flowed down the sides of the mower walls and at the center of the blade. That portion of the grass which was acted on by the horizontal blast of air would be blown through the exit of the mower, but that portion of the grass which was in the updraft would first rise against the deck of the mower and then be blown downward into the revolving blade where it would be mascerated or mulched in the revolving blade. When a large enough ball of this pulverized vegetable matter collected, it would be ejected from the mower by centrifugal force through the outlet opening of the mower or by gravity and down draft at the side edges of the mower, if the grass were dry. If the grass were wet, the cohesion caused by the moisture would result in a more sluggish flow and increase the mulching action of the blade until the mower became so clogged it would stall the motor.

In the present invention the drum 30 eliminates the down draft at the center of the blade. The brim 37 deflects the down draft in an outwardly horizontal direction, and the baffle 41 prevents a down draft outward beyond the tip of the blade in one-half of the mower body. This strengthens the force of the horizontal blast of air to overcome the down draft in the other half of the body. Since the lawnmower of the present invention does not mulch the cut grass, it may be operated at a much lower speed than previously known mowers, with less horse power.

By providing a blade with only one upturned air vane, a sufficient updraft is created to lift the grass being cut and by providing a tunnel forming baffle and a drum having an annular brim plate the updraft which is created to lift the grass is overcome by centrifugal force to create mainly an outwardly acting force. The drum eliminates a spot in the power housing where grass cuttings can build up. The brim plate spaced from the deck creates by centrifugal motion a countering blast in a horizontal direction to offset the updraft created by the air vane on the cutter blade, and the tunnel baffle eliminates down draft in one-half of the mower housing.

The mower of the present invention may be equipped with a very economical and easily attached grass cutting collector. Rotary mowers have been provided with grass cutting collector means in the past. However, the body and housing of such mowers have undergone radical changes, and in many of these known mowers, auxiliary air moving means have been provided. This requires a motor of greater horsepower, and the expense of operation is consequently increased.

Since the mulching action of prior known mowers has been substantially eliminated by the present invention, the simpel type of grass cutting collector 45 shown in FIGURE 5 may be attached at the outlet 20.

The grass cutting collector 45 is of substantially truncated pyramidal shape having the bottom 46, sidewalls 47, 48 and end wall 49, made of perforated or latticed material such as punched-out sheet metal. A lid 50, also made of perforated or latticed material, such as woven wire fabric to give good visibility, having metal reinforced edges 51, 52 is attached by fastening means, such as snap fasteners 53, along one or both of the edges 51, 52. The edge 51 may be extended downwardly to provide a lip to hold it in place by friction, in lieu of the snap fasteners 53.

A pair of bolt studs 54, having one end threaded and passed through holes 55 in the deck 12 adjacent the outlet 20 are received in the slots 56 of the collector 45 to hold it in place at the outlet 20.

The horizontally directed blast of air carries the grass cuttings into the collector. The perforate construction of the collector permits the air to escape, but the perforations are of a size which will not permit the grass cuttings to pass through them, or any foreign objects as sticks and stones. This is a safety feature for stopping flying objects.

While there has been disclosed in the foregoing description a practical embodiment of the rotary power mower in accordance with the present invention, it will be understood by those skilled in the art that variations in the implementation of the concept of the invention are within the purview and scope of the invention.

What is claimed is:

1. In a rotary power lawn mower having a wheeled body portion with a deck, sidewalls depending from said deck and having a motor mounted on said body portion, the improvement comprising, in combination, a shaft having one end extending into said body portion and being vertically mounted centrally thereof, means operatively connecting said shaft and said motor for driving said shaft, a cutter blade fixedly mounted on said end of said shaft extending into said body portion, a drum mounted on said shaft in superposed relation to said cutter blade, said drum having a circular base and a cylindrical wall upstanding therefrom, an annular brim mounted adjacent the top of said cylindrical wall and extending outward therefrom in a horizontal plane, a horizontal crescent shaped baffle attached to the depending edges of said side walls, and said horizontal baffle extending substantially under the rear half of said body portion and beneath the blade.

2. In a rotary power lawn mower having a wheeled body portion with a deck, sidewalls depending from said deck and having a motor mounted on said body portion, the improvement comprising, in combination, a shaft having one end extending into said body portion and being vertically mounted centrally thereof, means operatively connecting said shaft and said motor for driving said shaft, a cutter blade fixedly mounted on said end of said shaft extending into said body portion, said cutter blade mounting being intermediate its ends, a cutting portion at each end of said cutter blade, an air vane on one end of said cutter blade, a drum mounted on said shaft in superposed relation to said cutter blade, said drum having a circular base and a cylindrical wall upstanding from the periphery of said base, an annular brim mounted adjacent the top of said cylindrical wall and extending outward therefrom in a horizontal plane, a crescent shaped semicircular horizontally disposed baffle attached to the depending edges of said side walls of said body portion, said horizontally disposed baffle extending substantially under the rear half of said body portion and beneath the blade to form a tunnel through which said cutter blade travels during one-half of a revolution of said shaft, a vertical baffle bridging the distance between the semicircular peripheral edge of said horizontal baffle and said deck, and said depending side wall of said body portion having an outlet.

3. In a rotary power lawn mower having a wheeled body portion with a deck, side walls depending from said deck to define a grass cutting chamber and having a motor mounted on said deck with the drive shaft of said motor extending vertically through a centrally positioned aperture in said deck into the grass cutting chamber, the improvement comprising in combination, a sleeve fixedly mounted on said motor shaft, said sleeve having a mitered end, a drum mounted on said sleeve, said drum having a horizontal circular base and a cylindrical wall upstanding from the periphery of said base, a longitudinally extending cutter blade apertured intermediate its ends to receive said motor shaft and be received in the mitered end of said sleeve, whereby said sleeve, said drum and said cutter blade will revolve with said motor shaft, an annular brim mounted on said drum adjacent the top of said cylindrical wall and extending outward therefrom in a horizontal plane, a cutting portion at each end of said cutter blade, an air vane on one end of said cutter blade, a substantially crescent shaped horizontally disposed baffle attached to the depending edges of said side walls of said body portion, said horizontally disposed baffle extending substantially under the rear half of said body portion and the blade to form a tunnel through which said cutter blade travels during one-half of a revolution of said shaft, a vertical baffle bridging the distance between the semicircular peripheral edge of said horizontal baffle and said deck, and said depending side wall of said body portion having an outlet.

4. In a rotary power lawn mower as claimed in claim 3, in combination, a grass cutting collector having a perforate receptacle portion, an inlet and a removably attached lid and means for attaching said collector to said outlet.

5. In a rotary power lawn mower having a wheeled body portion with a deck, sidewalls depending from said deck and having a motor mounted on said body portion, the improvement comprising, in combination, a shaft having one end extending into said body portion and being vertically mounted centrally thereof, means operatively connecting said shaft and said motor for driving said shaft, a cutter blade fixedly mounted on said end of said shaft extending into said body portion, a drum mounted on said shaft in superposed relation to said cutter blade, said drum having a circular base and a cylindrical wall upstanding therefrom, an annular brim mounted adjacent the top of said cylindrical wall and extending outward therefrom in a horizontal plane, a discharge outlet in one of said side walls, crescent shaped baffle means adapted to cooperate with said cutter blade to regulate and direct a flow of air toward said outlet, said baffle means attached to the depending edges of said side walls and extending substantially under said body portion.

References Cited in the file of this patent

UNITED STATES PATENTS

| | | |
|---|---|---|
| 2,559,920 | Hainke | July 10, 1951 |
| 2,718,739 | Long | Sept. 27, 1955 |
| 2,796,714 | Denney | June 25, 1957 |
| 2,809,488 | Sewell | Oct. 15, 1957 |
| 2,876,609 | Swanson | Mar. 10, 1959 |
| 2,882,668 | Murillo | Apr. 21, 1959 |

FOREIGN PATENTS

| | | |
|---|---|---|
| 152,399 | Australia | July 17, 1953 |
| 1,163,635 | France | Apr. 28, 1958 |